Oct. 2, 1928.
E. DEISTER
1,685,941
VIBRATING MOTION PRODUCING MECHANISM
Filed May 24, 1926
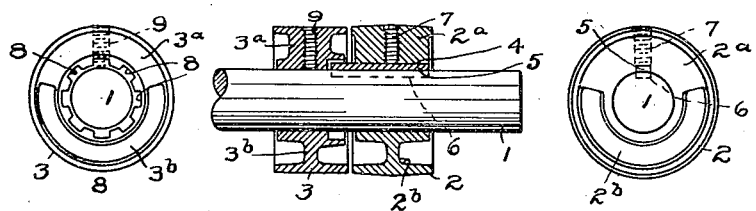
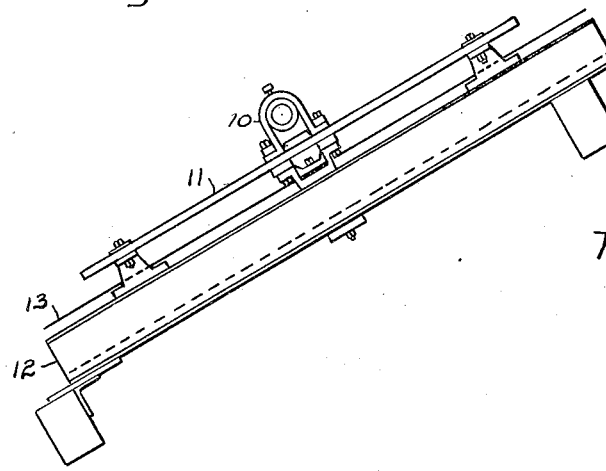
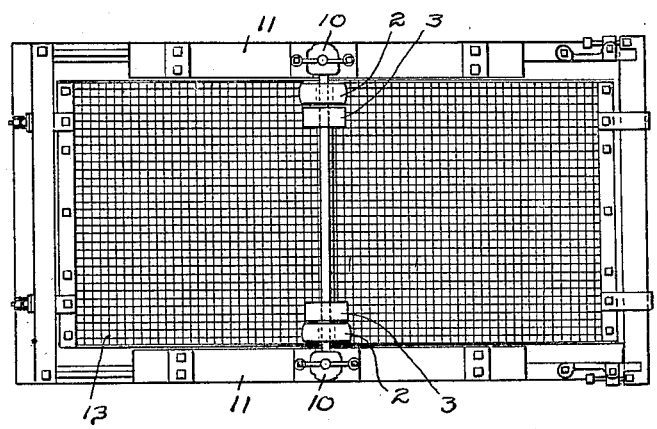
INVENTOR.
Emil Deister
BY
ATTORNEY.

Patented Oct. 2, 1928.

1,685,941

UNITED STATES PATENT OFFICE.

EMIL DEISTER, OF FORT WAYNE, INDIANA.

VIBRATING MOTION-PRODUCING MECHANISM.

Application filed May 24, 1926. Serial No. 111,224.

The invention relates to mechanisms for producing vibratory motion.

The object of the invention is to provide a simple and efficient mechanism by which to produce a vibratory movement in the object to which it may be connected, the mechanism being adjustable in novel manner to effect various degrees of vibration.

The invention consists of two adjacent unbalanced members or off-center weights, one secured to a revoluble member and the other revolubly mounted on the revoluble member and adapted to be secured thereto in various peripherally adjusted positions.

The invention is illustrated in the accompanying drawings, in which

Figure 1 is a fractional view of a shaft and the unbalanced members thereon shown in vertical section; Fig. 2 a side elevational view of the other unbalanced members; Fig. 3 a side elevational view of the other unbalanced member; Fig. 4 a plan view of a vibrating screen illustrating the application of the invention and Fig. 5 a side view of the screen.

In the illustrative embodiment of the invention the mechanism comprises a shaft 1 that will be revolubly supported and two members 2 and 3. A portion $2^a$ of the member 2 is materially thicker than the portion $2^b$ thereof that is diametrically opposite, thus forming an unbalanced condition in the member. Similarly the portion $3^a$ of the member 3 is thicker than the portion $3^b$ thereof, and for the same purpose.

The members 2 and 3 are adapted to be mounted on the shaft 1. A key-way 4 is formed in the member 2 for the reception of a key 5 that is disposed in a key-way 6 formed in the shaft. The key 5 locks the member 2 to the shaft against rotation thereon and to assure that the member will not move longitudinally on the shaft, I provide a set screw 7 that is inserted in the member and is caused to firmly engage the face of the shaft or the key 5.

One end of the key 5 projects from the member 2 and is adapted to be engaged by any one of the series of notches or sockets 8 that are formed in the side face of the member 3. This member 3 also carries a set screw 9 for positively locking said member to the shaft, which member is adjusted thereon by loosening the set screw 9, then sliding the member 3 along the shaft to discharge it from the key 5, then rotating the member until the selected notch or socket 8 therein is in alinement with the key 5, whereupon the member 3 is moved toward the member 2 to engage the key in the selected notch or socket 8 and the set screw 9 is then tightened. In this manner any selected peripheral adjustment of the member 3 may be readily accomplished.

When the shaft is rotated at proper speed as by a belt leading from a source of power and engaged on either member 2 or 3 or otherwise arranged to drive the shaft, the unbalanced condition of the members will cause the shaft to vibrate as it rotates and also any object that is connected to it.

In Figs. 4 and 5 the shaft 1 is mounted in two bearings 10 that are mounted on two elastic members 11 respectively, the members 11 being supported on the frame 12 of a screen and suitably connected to the screening medium 13 that is also supported on the frame. I show two sets of the members 2 and 3 and the belt from an electric motor or other source of power may be connected to any one of the same. As the shaft is rotated the members cause it, the elastic members and the screening medium to vibrate positively and most effectively. I make no further reference or claim to the application of the mechanism to the screening mechanism since I have described the same in an application filed concurrently herewith.

It is a simple matter to adjust the member 3 to secure any desired degree of vibration of the shaft and of the parts connected thereto and the form of the members may be such as the user desires. I prefer to form the member 2 with its periphery concentric with the shaft so that said member may be used as a pulley to drive the shaft.

The mechanism is adaptable to various devices where a vibrating movement is desired.

What I claim is:

1. A mechanism to produce vibratory motion comprising a revolubly mounted shaft, a pair of unbalanced members on the shaft one of which is secured to the shaft, a key on the shaft and adapted to engage the other unbalanced member at any one of a plurality of peripherally spaced points.

2. A mechanism to produce vibratory motion comprising a revolubly mounted shaft, an unbalanced member secured to the shaft, a key on the shaft and a second unbalanced member on the shaft having an annular series of sockets in one face adapted to be engaged selectively by the key, selection of a socket being accomplished by rotating the said member on the shaft and means to lock the latter member in peripherally adjusted position.

3. A mechanism to produce vibratory motion comprising a revolubly mounted shaft, a pair of unbalanced members on the shaft one of which is secured to the shaft, a fixed member adapted to engage the other unbalanced member at any one of a plurality of peripherally spaced points for controlling peripheral adjustment of said unbalanced member on the shaft.

In witness whereof I have hereunto signed my name this 20th day of May, 1926.

EMIL DEISTER.